United States Patent
Jones

(10) Patent No.: US 7,114,467 B2
(45) Date of Patent: Oct. 3, 2006

(54) PET LEASH FOR TWO

(76) Inventor: Linda Lee Jones, 841 Moxchehalis Rd., McCleary, WA (US) 98557

( * ) Notice: Subject to any disclaimer, the term of this patent is extended or adjusted under 35 U.S.C. 154(b) by 0 days.

(21) Appl. No.: 11/328,210

(22) Filed: Jan. 10, 2006

(65) Prior Publication Data

US 2006/0150923 A1    Jul. 13, 2006

Related U.S. Application Data

(60) Provisional application No. 60/642,767, filed on Jan. 11, 2005.

(51) Int. Cl.
*A01K 27/00* (2006.01)

(52) U.S. Cl. .................... 119/795; 119/787
(58) Field of Classification Search ............ 119/795, 119/787, 769, 792, 797, 798, 712, 770, 793
See application file for complete search history.

(56) References Cited

U.S. PATENT DOCUMENTS

| | | | | |
|---|---|---|---|---|
| 3,120,403 | A * | 2/1964 | Molzan et al. ............ | 294/74 |
| 4,879,972 | A * | 11/1989 | Crowe et al. ............ | 119/792 |
| 4,892,063 | A * | 1/1990 | Garrigan .................. | 119/795 |
| 5,483,925 | A * | 1/1996 | Childress ................. | 119/795 |
| 5,485,810 | A * | 1/1996 | Sporn ...................... | 119/792 |
| 5,551,379 | A * | 9/1996 | Hart ........................ | 119/771 |
| 5,632,234 | A * | 5/1997 | Parker ..................... | 119/795 |
| 5,701,848 | A * | 12/1997 | Tozawa .................... | 119/797 |
| 5,732,662 | A * | 3/1998 | Jacobsen .................. | 119/798 |
| 5,901,668 | A * | 5/1999 | Goodger, Sr. ............ | 119/795 |
| 6,029,611 | A * | 2/2000 | Hershauer ................ | 119/771 |
| 6,047,665 | A * | 4/2000 | Deveaux .................. | 119/770 |
| D425,265 | S * | 5/2000 | Rubinstein .............. | D30/153 |
| 6,237,539 | B1 * | 5/2001 | Sporn ...................... | 119/795 |
| 6,247,428 | B1 * | 6/2001 | Mireles ................... | 119/795 |
| 6,273,029 | B1 * | 8/2001 | Gish ........................ | 119/792 |
| 6,439,168 | B1 * | 8/2002 | Maglich et al. .......... | 119/795 |
| 6,460,488 | B1 * | 10/2002 | Manzella et al. ........ | 119/798 |
| 6,474,270 | B1 * | 11/2002 | Imes ....................... | 119/796 |
| 6,539,897 | B1 * | 4/2003 | Dossenback ............. | 119/795 |
| 6,626,132 | B1 * | 9/2003 | Mann ...................... | 119/795 |
| 6,701,873 | B1 * | 3/2004 | Fradette, II .............. | 119/784 |
| 6,932,027 | B1 * | 8/2005 | Whitney .................. | 119/770 |
| 6,990,929 | B1 * | 1/2006 | Young, III ............... | 119/798 |
| 2005/0000470 | A1 * | 1/2005 | Fountoulakis ............ | 119/769 |

* cited by examiner

*Primary Examiner*—Yvonne R. Abbott

(57) ABSTRACT

A pet leash for walking two pets such as dogs, together without tangling. It is great for training your pets to walk on a leash This invention is durable and made in many colors and sizes, Made with nylon strapping, The leash has a handle at one end and a metal ring at the other end. machine sewn, This leash is removable.

With another piece of nylon strapping, at one end there is a swivel snap or equivalent to that is sewn for security, then a colorful hollow rod is slid onto the strapping next to the swivel snap Then another swivel snap is slid onto the strapping then another colorful hollow rod is slid onto the strapping, then the final swivel snap is sewn to the end of the strapping for security.

1 Claim, 1 Drawing Sheet

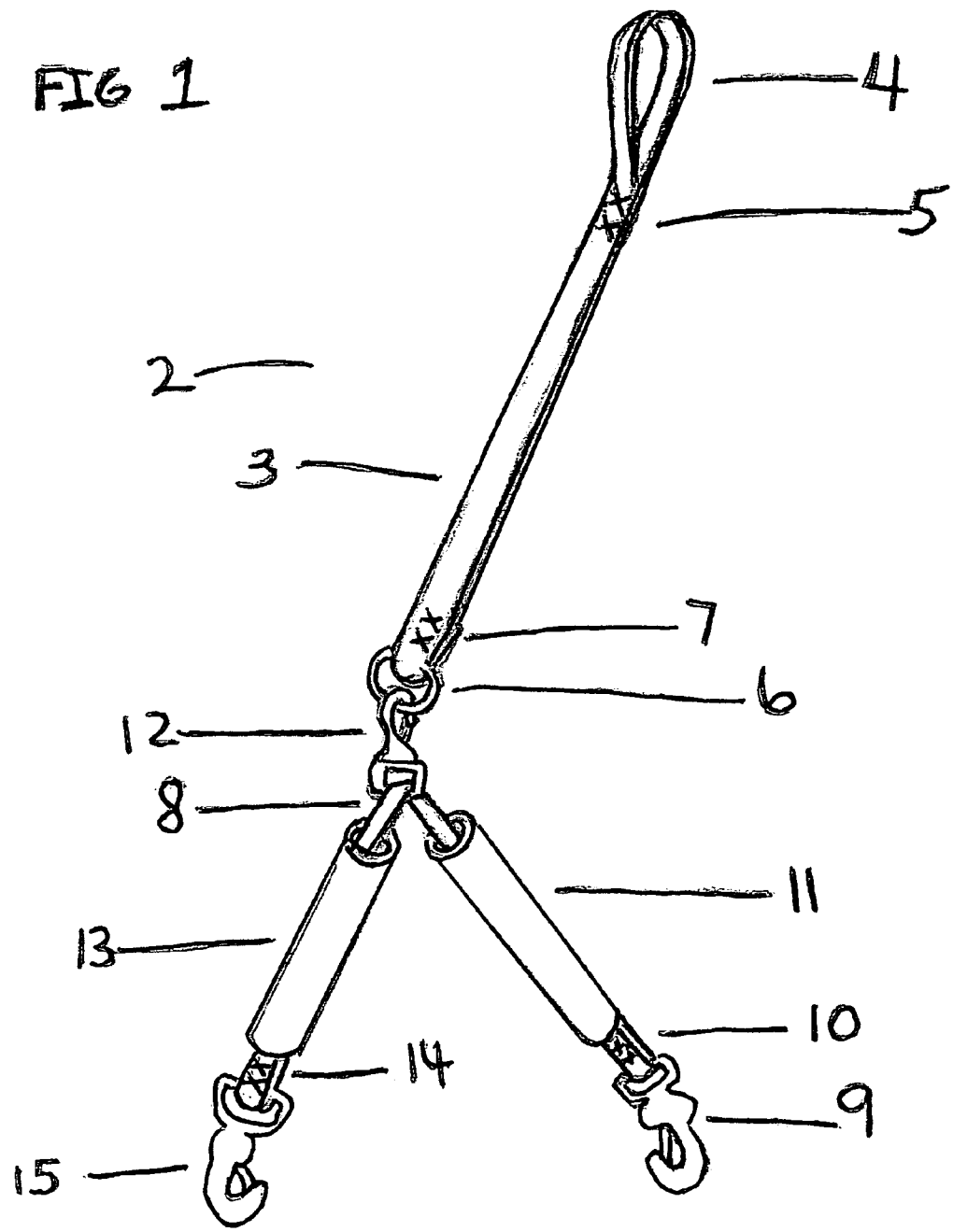

PET LEASH FOR TWO

This application claims priority to Provisional Patent Application No. 60/642,767, filed Jan. 11, 2005.

BACKGROUND OF THE INVENTION

1. Field of Invention

This invention relates to walking two pets simultaneously without tangling; making walking pets pleasurable.

2. Prior Arts Descriptions

There are many pet owners that enjoy walking two pets at one time but find themselves getting consistently tangled up, tripped, leash burned, and pulled in two different directions. This least solves those problems by making walks with a pets a pleasure. There are a wide variety of inventions that have been created for walking two or more dogs simultaneously. Such as Goodger, Sr. U.S. Pat. No. 5,901,668, although the use of swiveling action is a concept that helps prevent entanglement. This I believe couldn't completely prevent entanglement. Because the multiple leads are made of flexible material witch in some cases could possibly become entangled. With my design its believed that the hollow rods over the two pet leads will prevent the lead materials from becoming entangling. The pet leash for two is designed to walk two pets at the same time without tangling it can be used in multiple ways. The leash can be removed so handler can add a different length lead. Unlike Maglich, U.S. Pat. No. 6,439,168, where as long as the length of leash is set with one length and not versatile. The present pet leash for two it is a tangle free leash, made with nylon strapping, three swivel snaps, and two hollow rods. These rods prevent tangling. The present pet leash for two is designed for walking two pets such as dogs at one time without the possibility of tangling the dogs or the strapping. The pet leash for two is made of nylon strapping, three swivel snaps, a removable leash, and two hollow rods. These hollow rods prevent tangling unlike the flexible leads in reference to Sporn, U.S. Pat. No. 6,237,539, Crowe; U.S. Pat. No. 4,879,972, and Mireles, U.S. Pat. No. 6,247,428.

BRIEF SUMMERY OF INVENTION

The said invention is for walking two pets such as dogs. The dogs can be of equal sizes, or unequal (ten to twelve inches difference). The primary embodiment includes an elongated leash line with a handle sewed on one end and a metal ring sewed on the opposite end. This metal ring is attached to the dual restraints, center swivel snap. A dual restraint consisting of nylon strapping, with first swivel action snap attached to one end an sewed on for security, a colorful hollow rod is then slid onto the nylon strapping next to first swivel action snap, the center swivel snap is slid onto the nylon strapping next to the first colorful hollow rod, a second colorful hollow rod is then slid onto the strapping next to the center swivel snap, a third and final swivel snap is slid onto the strapping next to the second colorful hollow rod and sewed for security at the end of the said strapping. The swivel action snaps allow pets such as dogs to move around each other freely. The hollow rods prevent the strapping from becoming entangled and keeping pets such as dogs from becoming entangled. It is critical that the hollow rods extend substantially the length of the strap portions between the first swivel snap and the center swivel snap, and from the center swivel snap to the third swivel snap. This makes a two pet leash that cannot become entangled, and allow handler to restraint pets such as dogs with one hand, leaving the other hand free. The leash with said handle if removable so that a person can use a different length lead.

BRIEF DESCRIPTION OF THE DRAWING

These, as well as other features of the present invention, will become more apparent upon reference to the drawing, wherein:

FIG. 1 is a perspective view of a multiple animal-walking device constructed in accordance to a preferred embodiment of the present invention.

DESCRIPTION OF PREFERRED EMBODIMENTS

Referring now to FIG. 1, there is illustrated an apparatus 2 for controllably walking two (2) pets simultaneously. As illustrated, the device 2 comprises an elongated leach 3 portion preferably made of nylon strapping. Attached to one end of the leash is a handle or a grip member 4 that facilities handling of device, wherein the handle is preferably formed by folding the leash over onto itself thereby forming a loop and stitching as shown at 5. A metal ring 6 is attached to the other end, and secured by the leach being again folded over and secured by stitching at 7. A dual action restraint 8 is also preferably constructed of nylon strapping, and is attached to the metal ring 6 by means of a center swivel action snap 12. The dual action restraint 8 includes a swivel action snap 9 and 15 secured at opposite ends by stitching at 10 and 14, respectively, and colorful hollow rods 11 and 13. The hollow rods 11 and 13 are slidably attached to the restraint 8, and each rod extends the length of the portion of the restraint 8 between swivel snaps 9 and 15, and the center swivel snap 12.

As will be appreciated by those skilled in the art, the device 2 may be formed from a variety of materials, and may be have varying lengths to accommodate different size animals. The structure, however, remains consistent with the hollow rods extending the length of and substantially covering the strap 8 from the end swivel snaps 9 and 15 to the center swivel 12.

Once the pets are secured to the device 2, an individual, by grasping the handle 4 on the leash member 3, may thus control both animals simultaneously. Further, the invention is highly adaptable due to the center swivel snap 12 being advantageously removable from the metal ring 6 of the leash 3, and capable of being secured to alternate animal securing devices such as a stake or hitching post, or an eyebolt in the rear of a truck bed. Due to the configuration of the device 2, regardless of where the animals are secured, the dual restraint permit's the animals to move, however prevents them from becoming entangled. As will further be appreciated by those skilled in the art, the device 2 of the present invention may be sized and configured pursuant to a multitude of variations to accommodate animals of varying sizes, and the strapping may be formed from any of a variety of colors and materials.

Although the invention has been described herein with specific reference to a presently preferred embodiment thereof, it will be appreciated by those skilled in the art that various modifications, deletions, and alterations may be to such preferred embodiments without departing from the spirit and scope of the invention. Accordingly, it is intended that all reasonably foreseeable additions, modifications, deletions and alterations be included within the scope of the invention as defined in the following claims.

I claim:

1. A tangle free pet leash for two comprising:

a removable leash made of nylon strapping, having a handle for the human hand to hold at one end, and a metal ring secured to the opposite end for security;

a dual restraint made of nylon strapping and having two opposing distal ends and an intermediate portion, wherein said intermediate portion of said dual restrait is attached to the metal ring by a center swivel action snap slidably secured to the reastraint;

said dual restraint further comprising first and second swivel end snaps secured at said opposing distal ends, and first and second colorful hollow rods slidably attached along the restraint, such that the first rod extends substantially the length of the portion of the restraint between the first swivel end snap and the center swivel snap, and the second rod extends substantially the length of the portion of the restraint between the second swivel end snap and the center swivel snap.

* * * * *